RADIO SIGNAL RECEIVING SYSTEM

Original Filed Dec. 1, 1954

2 Sheets-Sheet 1

INVENTORS
LESLIE E. FLORY &
BY WINTHROP S. PIKE
H. L. Newton
ATTORNEY

INVENTOR.
LESLIE E. FLORY &
BY WINTHROP S. PIKE

H. L. Newton
ATTORNEY 2,968,802

RADIO SIGNAL RECEIVING SYSTEM

Leslie E. Flory and Winthrop S. Pike, Princeton, N.J., assignors to Radio Corporation of America, a corporation of Delaware Continuation of abandoned application Ser. No. 472,279, Dec. 1, 1954. This application Apr. 26, 1957, Ser. No. 655,440
12 Claims. (Cl. 340—248)

This application is a continuation of application Serial No. 472,279 filed on December 1, 1954, for "Radio Signal Receiving System," now abandoned.

This invention relates, in general, to radio signal receiving systems, and in particular to radio signal receivers wherein means are provided for indicating the presence of an incoming signal and that the receiver is conditioned for reception in the absence of a received signal.

In some communication systems the signal receivers of the system must be receptive to signals at all times, even though relatively long periods of time may elapse between the reception of signals. One example of a system of this type is an alarm or warning system, which warns the driver of a vehicle of an impending dangerous condition at a remote point which the vehicle is approaching. The danger point could be, for example, an intersection controlled by a traffic signal which the driver is prevented from seeing until he is very close to it. By associating a radio transmitter with the traffic signal, signals could be generated whenever the traffic signal is in the stop position. A radio signal receiver in the vehicle, which is tuned to the transmitted signal, could then pick up the generated signal and by means of suitable visual and/or audible signals warn the driver of the vehicle of the impending dangerous condition. The driver thus warned could then take appropriate measures to decrease the speed of his vehicle. It is obvious, of course, that a radio receiver of this general type should be extremely reliable. Thus, in the absence of a transmitted signal, some means should be provided for indicating that the receiver is functioning properly. In this manner, the driver will be warned of any failures of the receiver.

It is, accordingly, an object of the present invention to provide a radio signal receiving system wherein means are provided for indicating that the receiver is operative and conditioned for signal reception.

It is another object of the present invention to provide a radio signal receiver for receiving and indicating alarm or warning signals and wherein means are provided for indicating that the receiver is functioning properly in the absence of the alarm or warning signals.

It is still another object of the present invention to provide a simple yet reliable radio signal receiver utilizing semi-conductor devices such as transistors wherein means are provided for continually checking the proper functioning of the receiver when in operation.

It is yet another object of the present invention to provide a transistorized radio signal receiver suitable for use in automobiles and the like for receiving and indicating warning or alarm signals wherein means are provided for indicating to the driver of the automobile that the receiver is operative in the absence of a warning or alarm signal.

These and further objects and advantages of the present invention are achieved, in general, by a radio signal receiver which may use transistors as the active signal translating and amplifying elements. The signal receiver may include an amplifier, a detector and an oscillator as well as suitable signal indicating means, such as a lamp or a buzzer, associated with control means, such as a relay. In the presence of a received signal the output signal from the detector energizes the relay to turn the indicating means "on." In the absence of a received signal, the oscillator is energized to provide an oscillator output signal which is applied to the input of the receiver. Accordingly, the output signal from the detector is sufficient to energize the relay and turn the indicating means "on." At the same time, the energizing voltage for the oscillator is removed. Thus, the indicating means is alternately in an "on" and an "off" state which indicates to the operator or driver of, for example, a vehicle, that the receiver is functioning properly.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
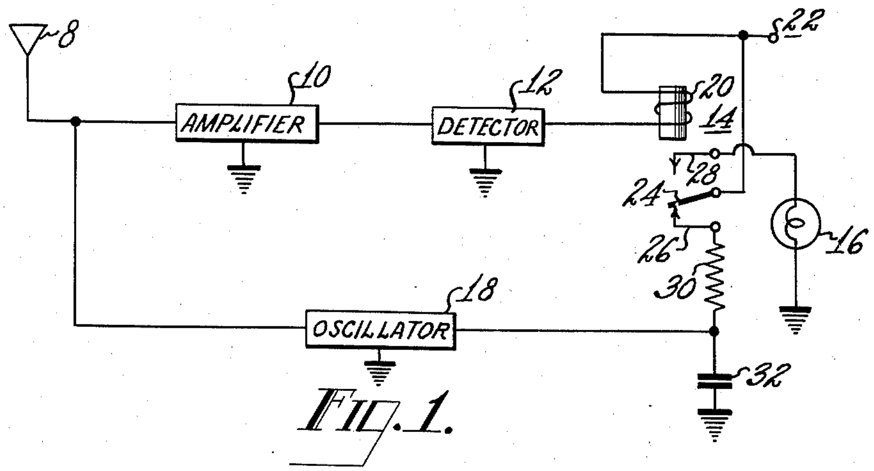
Figure 1 is a schematic circuit diagram, partially in block form, of a radio receiving system in accordance with the invention.

Referring now to the drawing, wherein like parts are indicated by like reference numerals throughout the figures, and referring particularly to Figure 1, a radio receiving system in accordance with the invention includes, in general, an antenna 8, a radio frequency amplifier 10, a signal detector 12, control means such as a relay 14, indicating means such as a lamp 16 and an oscillator 18. The antenna 8 is connected to the input circuit of the amplifier 10 and the output circuit of the amplifier 10 is connected to the input of the detector 12. The output circuit of the detector 12 is, in turn, connected to a solenoid 20 of the control means or relay 14. The upper end of the solenoid 20 is returned to a terminal 22 which is connected to a suitable source of energizing or biasing potential such as a battery. In the present example, the energizing potential may be considered to be of a negative polarity although it could be of a positive polarity if desired.

The relay 14 further includes a movable switch 24, which is actuated in accordance with the energization of the solenoid 20 and two stationary contacts 26 and 28. The switch 24 is connected directly with the negative terminal 22. The lower or back contact 26 of the relay 14 will be referred to as the "closed" contact since when the switch 24 is in this position the solenoid 20 will normally be deenergized, or not sufficiently energized to move the switch 24 into the up or "open" position when it contacts the "open" or forward contact 28 of the relay 14. The open contact 28 of the relay 14 is connected directly with the indicating means or lamp 16. The closed or back contact 26 of the relay 14 is connected through a time constant network comprising a series resistor 30 and a capacitor 32 to a point of fixed reference potential or ground for the system as shown.

The junction point of the resistor 30 and the capacitor 32 is connected to the input circuit of the oscillator 18. The output circuit of the oscillator 18 is, in turn, connected directly with the input circuit of the signal amplifier 10 of the receiver.

In operation, biasing potentials are applied through the closed or back contact 26 of the relay 14 to the oscillator circuit 18. The oscillator 18 is, accordingly, energized and begins to oscillate. The oscillator signal thus generated, the frequency of which is chosen to be equal to the frequency to which the receiver will normally be tuned, is applied to the input of the receiver. The oscillator signal is, accordingly, amplified by the amplifier 10 and detected by the detector 12. The output signal from the detector 12 thus energizes the solenoid 20 of the relay 14 sufficiently that the relay switch 24 is pulled up to contact the open or forward contact 28. Hence, the biasing voltage which is applied at the negative terminal 22 is removed from the oscillator 18. The amplitude of the oscillator signal now decays at a rate which is determined by the resistor 30 and the capacitor 32. When the amplitude of the oscillator signal reaches a sufficiently low level, the solenoid 20 will not be energized sufficiently to hold the switch 24 in the "up" position and it will drop back into contacting engagement with the closed contact 26. The cycle then repeats.

Accordingly, in the absence of a received signal the oscillator signal will alternately energize the solenoid 20 of the relay and the lamp 16 will alternately receive a potential from the supply means. Thus, the lamp 16 will flash on and off. This will give the operator (such as the driver of an automobile) an indication if the receiver is functioning properly. If the receiver is not operating correctly, the lamp 16 will cease to flash and the operator will be warned of this condition. When a warning signal is picked up by the antenna 8, however, it will be amplified and detected, and the output signal from the detector 12 will be of sufficient amplitude to energize the solenoid 20 of the control means or relay 14. During the reception of an external warning signal, therefore, the relay switch 24 will be in its open or upper position in contacting engagement with the forward contact 28, and the lamp 16 will remain in an "on" condition through the application of an energizing voltage from the negative terminal 22. Accordingly, the operator is immediately warned that a warning or alarm signal is being picked up by the receiver.

A radio receiver of the type described and illustrated in Figure 1 will thus be seen to be suited for applications wherein the receiver must be receptive to signals at all times, yet the intervals between the reception of signals are quite lengthy. Such a system might be used, as was mentioned hereinbefore, in a warning system for vehicles such as automobiles. Thus, a signal transmitter might be located near a traffic signal which is located near a curve or under a hill, for example, and not, thereby, easily seen by the driver of an approaching automobile. The transmitter would be arranged so that when a traffic signal gives an indication for approaching traffic to stop, signals of a frequency to which the radio receiver is tuned would be transmitted. These signals would be picked up by the antenna of the radio receiver and amplified and detected as described to energize the relay, thus applying energizing potentials to the indicating device and turning it on, in which condition the indicating means would remain until the external transmitted signal was removed. In the absence of the transmitted signal, however, the indicating means would be alternately "on" and "off" due to the action of the oscillator in conjunction with the relay. Thus, the driver is given a continuous indication that the receiver is operating properly. Such a receiver, while performing such functions with reliability, is characterized, in addition, by the relative simplicity of its circuit connections.

Figure 2:
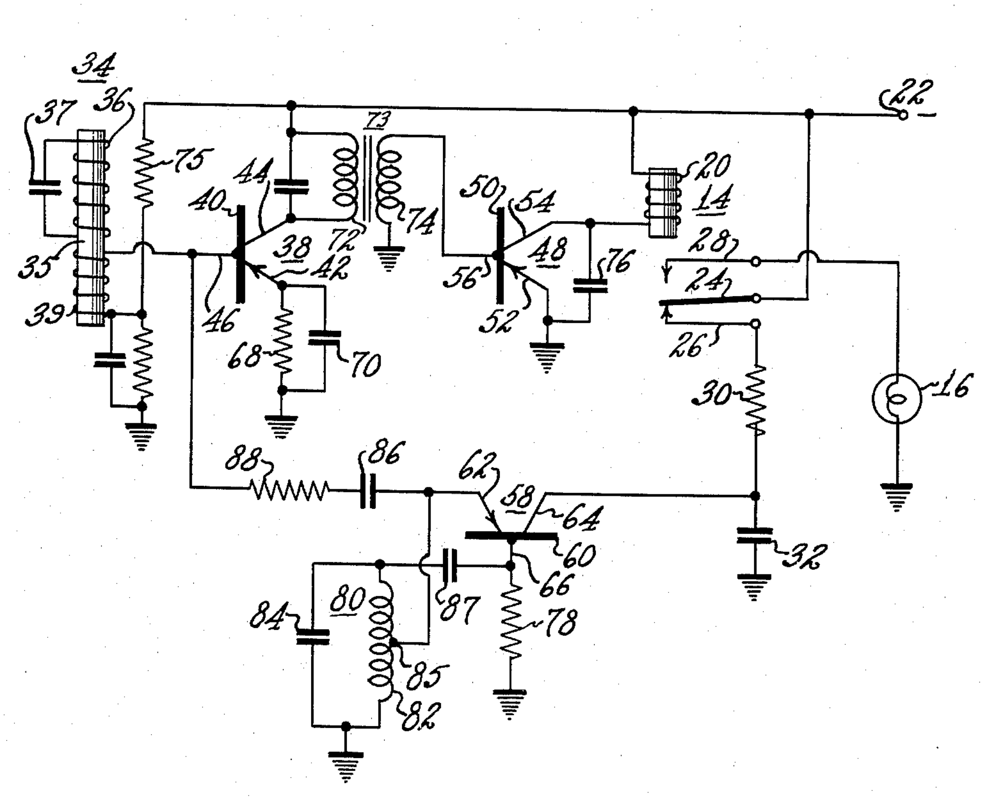
Figure 2 is a schematic circuit diagram of a transistor radio receiving system of the type illustrated in Figure 1 and embodying the invention.

A radio receiver of the same general type as the receiver illustrated in Figure 1, is shown in Figure 2 and includes, in general, a loop antenna 34, a transistor amplifier 38, a detector transistor 48, a control means or relay 14, the indicating means or lamp 16 and a transistor 58 which is the active element of an oscillator circuit. Each of the transistors may be considered to be, for example, junction transistors of the P-N-P type and includes a semi-conductive body with which three electrodes are cooperatively associated in a well known manner. Thus, the transistor amplifier 38 includes a semi-conductive body 40 and an emitter 42, a collector 44 and a base 46. The transistor 48, which serves as a signal detector, also includes a semi-conductive body 50 and an emitter 52, a collector 54 and a base 56. In the same manner, the oscillator transistor 58 includes a semi-conductive body 60 and emitter 62, collector 64 and base 66 electrodes.

The loop antenna 34 comprises a ferrite rod 35 having an input winding 36, which is connected in parallel with a tuning capacitor 37, which tunes the antenna to the desired incoming signal. The signal thus received is coupled through an antenna coupling winding 39 to the base 46 of the transistor amplifier 38. The emitter 42 of the transistor amplifier 38 is connected to ground through a stabilizing resistor 68 which is by-passed by a by-pass capacitor 70. Collector biasing potentials for the transistor amplifier 38 are provided by connecting the collector 44 through the primary winding 72 of an interstage coupling transformer 73 to the negative biasing supply terminal 22. The base 46 is also returned to the negative terminal 22 through the coupling winding 39 of the antenna 34 and a resistor 75.

The secondary winding 74 of the interstage coupling transformer 73 is connected directly with the base 56 of the detector transistor 48. The emitter 52 of the detector transistor 48 is connected directly with ground, while a capacitor 76 is connected between the collector 54 and ground. The biasing potentials for the detector transistor 48 are obtained by connecting the collector 54 through the solenoid 20 of the relay 14 to the negative biasing supply terminal 22. The back or closed contact 26 of the relay 14 is connected through the series resistor 30 and the capacitor 32 to ground. The junction of the resistor 30 and the capacitor 32 is connected directly with the collector 64 of the oscillator transistor 58. The base 66 of the transistor 58 is returned to ground through a biasing resistor 78.

The oscillator circuit further includes a parallel resonant tuned circuit or tank circuit 80 which comprises an inductor 82 and a capacitor 84 and which is tunable to the frequency of the oscillator signal, which frequency, as was mentioned hereinbefore, is normally the frequency to which the receiver is tuned. A tap 85 on the inductor 82 is connected to the emitter 62 of the transistor, while the upper end of the inductor 82 is connected through a coupling capacitor 87 to the junction of the base 66 and the base resistor 78.

The oscillator circuit will, accordingly, be recognized as being of the feedback type, sustained oscillation being obtained by virtue of regenerative feedback between the emitter 62 and the base 66. The developed oscillator signals are coupled through a serially connected capacitor 86 and resistor 88 to the base 46 of the transistor amplifier 38.

In operation, the circuit illustrated in Figure 2 will be seen to be substantially identical to the one illustrated in Figure 1. That is, when biasing potentials are applied through the back contact 26 of the relay 14 to the collector 64 of the oscillator transistor 58, the oscillator circuit is energized and begins to oscillate. The oscillator signal thus generated is coupled to the base 46 of the transistor amplifier 38 where it is amplified and then detected by the detector transistor 48. The output signal in the collector 54 of the detector transistor 48 is then used to energize the solenoid 20 of the relay 14 sufficiently that the relay switch 24 is pulled up to contact the forward contact 28. Hence, the bias voltage which is applied at the negative terminal 22 is removed from the collector 64 of the oscillator transistor 58. The amplitude of the oscillator signal then decays and when it reaches a sufficiently low level, the solenoid 20 will not be energized sufficiently to hold the switch 24 in the up position and it will drop back to contacting engagement with the back contact 26. This cycle will then repeat.

Accordingly, in the absence of a received signal the lamp 16 will alternately receive a potential from the supply means and will flash "on" and "off." This will give the operator or driver an indication if the receiver is functioning properly. If the receiver is not operating correctly in the absence of a received signal, the lamp 16 will cease to flash and the operator will be warned of this condition.

When a warning signal is picked up by the loop antenna 34, however, it will be amplified and detected. The output signal in the collector 54 of the detector transistor 48 will thus be of sufficient amplitude to energize the solenoid 20 of the control means or relay 14. During the reception of an external warning signal, therefore, the relay switch 24 will be in contacting engagement with the forward contact 28 and the lamp 16 will remain "on" during the application of energizing potentials from the negative terminal 22. In this manner, the operator is immediately warned that a warning or alarm signal is being picked up by the receiver.

Figure 3:
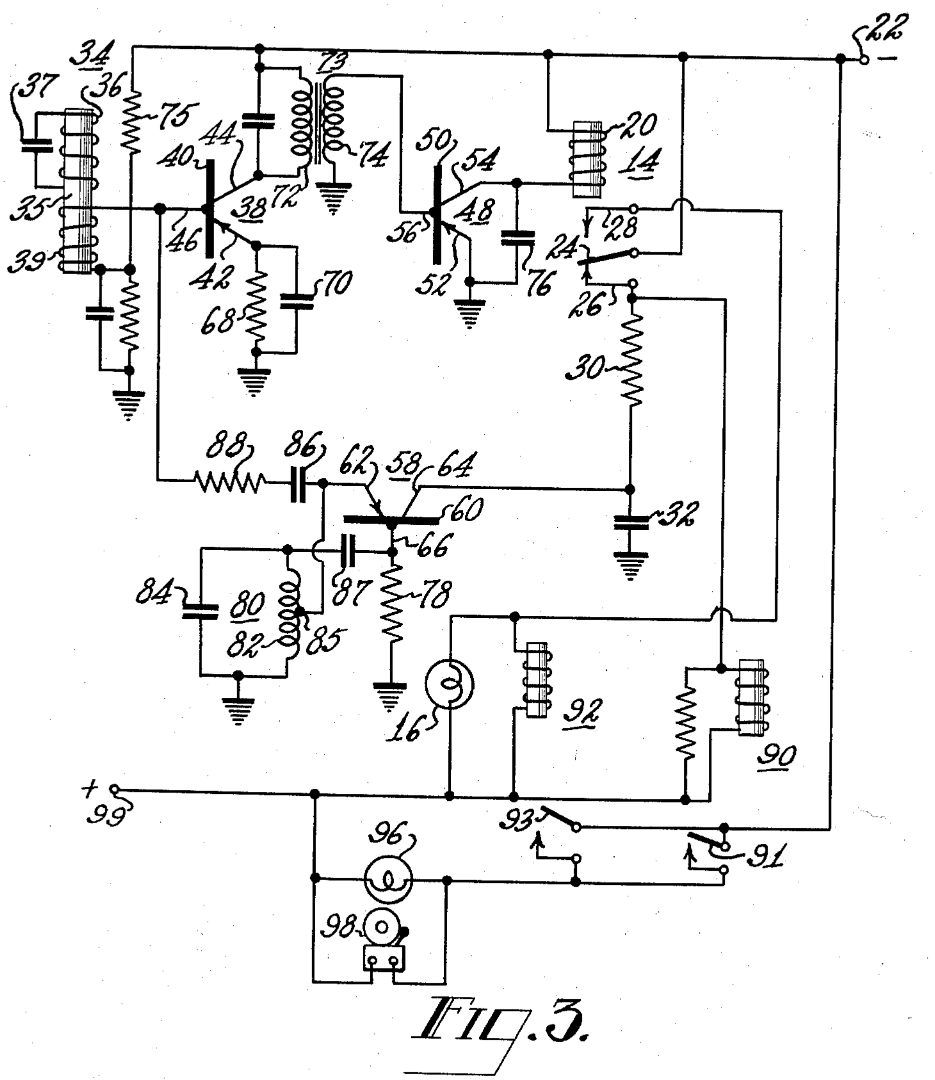
Figure 3 is a schematic circuit diagram of the transistor radio receiving system of Figure 2 provided with a modification of signal indicating portions thereof in accordance with the present invention.

Another embodiment of the invention which incorporates a somewhat more elaborate indicating means is illustrated in Figure 3 of the drawing, reference to which is now made. The signal receiver in the embodiment of the invention illustrated in Figure 3 is substantially identical to the one illustrated in Figure 2 and includes the loop antenna 34, the transistor amplifier 38, the detector transistor 48, the control relay 14, the indicating lamp 16 and the oscillator transistor 58. In addition, two slow release relays 90 and 92 are provided, the solenoids of which are connected in series with the back contact 26 and the forward contact 28 respectively of the relay 14. To give both a visual and an audible indication of the reception of a warning signal or that the receiver is inoperative, a second lamp 96 and a buzzer 98 are connected in parallel with each other and in series with the parallel connected switches 91 and 93 of the relays 90 and 92, respectively. Accordingly, when either of the switches 91 and 93 is closed, a complete circuit exists between the positive terminal 99 and the negative terminal 22 of the receiver.

In operation, the switch 24 of the relay 14 in Figure 3 is normally in contacting engagement with the open or back contact 26 of the relay 14. Thus, the oscillator circuit is energized by the application of negative biasing potentials from the terminal 22 to the collector 64 of the oscillator transistor 58 in the same manner as in Figure 2. The oscillator signals thus generated are applied to the base 46 of the transistor amplifier 38. The amplified signals are then detected by the transistor detector 48 and the resulting collector current of the transistor 48 is used to energize the solenoid 20 of the relay 14. The switch 24 then moves into contacting engagement with the forward or closed contact 28 of the relay 14. The energizing potentials from the terminal 22 are, accordingly, removed from the collector 24 of the oscillator transistor 58 and applied to the lamp 16. The amplitude of the oscillator signal then decays and the collector current of the detector transistor 48 is insufficient to hold the switch 24 in the up position. The switch 24 thus drops into contacting engagement with the open or back contact 26 and the cycle repeats.

As long as the cycle described above continues, the lamp 96 and the buzzer 98 remain unenergized since the switches 91 and 93 of the slow release relays 90 and 92 are in the open position. Thus, an open circuit exists between the positive terminal 99 and the negative terminal 22. If, however, a signal is received by the loop antenna 34, it will be amplified and detected and the collector current of the transistor 48 will be of sufficient magnitude to energize the solenoid 20 of the relay 14. The switch 24 of the relay 14 will, accordingly, be held in contacting engagement with the forward or closed contact 28.

When the switch 24 is in contact with the forward contact 28, the lamp 16 will remain illuminated, indicating to the operator that the receiver is still functioning properly. In addition, the relay 92 will be energized and its switch 93 will close. Accordingly, a complete circuit will exist between the positive terminal 99 and the negative terminal 22 including the parallel combination of the lamp 96 and the buzzer 98. Accordingly, the driver will receive an audible and visual indication that a warning or alarm signal has been received.

If the receiver is inoperative for some reason, the switch 24 of the relay 14 will remain in contacting engagement with the back or open contact 26. Accordingly, the other slow release relay 90 will be energized. thus, the switch 91 of the relay 90 will close while the switch 93 of the slow release relay 92 will remain opened. In this manner, a circuit is again completed between the positive terminal 99 and the negative terminal 22 including the lamp 96 and buzzer 98, which are connected in parallel.

At the same time, however, when the switch 24 is in contact with the back contact 26 the lamp 16 will no longer be illuminated. In the foregoing manner, the driver or operator is given a visual indication that the receiver is not functioning properly. Thus, three conditions are possible:

(1) The receiver is operating properly in the absence of a received signal. For this condition the lamp 16 will be alternately illuminated and extinguished.

(2) The receiver is operating properly in the presence of a received signal. For this condition the lamps 16 and 96 will remain illuminated and the buzzer 98 will be energized.

(3) The receiver is inoperative. For this condition the lamp 16 will be extinguished while the lamp 96 will be illuminated. The buzzer 98 will also be energized under this condition.

Thus, the arrangement shown in Fig. 3 gives both a visual and an audible indication to the operator if a warning signal is received or if the receiver is inoperative. In the absence of a signal, moreover, the circuit arrangement is such that the operator is given a visual indication that the receiver is operative.

It will be understood that while specific types of circuit arrangements for the receiver have been shown, they are by way of example only. Thus, the amplifier, detector and oscillator circuits of the receiver could take any of a number of different forms for performing these respective functions. Moreover, tubes as well as transistors or both could be used. In addition, transistors of opposite conductivity types could be used if the polarity of the biasing potentials is reversed.

As described herein, radio signal receivers are provided with means whereby the operator, such as the driver of an automobile, is given an immediate indication that a warning or alarm signal has been received, and in the absence of such a signal that the receiver is operative. Circuits in accordance with the invention for performing such functions are characterized not only by their simplicity but by their reliability.

What is claimed is:

1. In a radio signal receiver including a signal input circuit, the combination comprising, an oscillator tunable to substantially the same frequency as said receiver and having input and output circuits, means coupling the output circuit of said oscillator with said signal input circuit, said receiver thereby being operable to receive radio signals and signals from said oscillator means providing a source of operating voltage, control means coupled with said receiver and responsive to signals conveyed therethrough, indicating means for providing an indication of signal reception and of an operating condition of said receiver, and means included in said control means operative alternatively to connect said source with said indicating means in response to any of said received signals and with the input circuit of said oscillator in the absence of a received signal.

2. In a radio signal receiver including a signal input circuit and signal detection means, the combination comprising an oscillator tunable to substantially the same frequency as said receiver and having an input circuit and an output circuit, signal conveying means coupling the output circuit of said oscillator with said signal input circuit, means providing a source of operating voltage, said oscillator providing an output voltage of amplitude commensurate with the amplitude of received radio signals, indicating means providing an indication of signal reception and of an operating condition of said receiver, and control means connected with and controlled by said signal detection means to connect said source alteratively with said indicating means upon the reception of a received signal and with the input circuit of said oscillator only in the absence of a received signal.

3. A radio signal receiver for periodically receiving a warning signal of a predetermined frequency and providing an indication thereof comprising, in combination, signal amplifying means including an input and an output circuit, signal detection means coupled with the output circuit of said signal amplifying means, means providing a source of operating potential, control means connected with said signal detection means and responsive thereto, indicating means providing an indication of the reception of said warning signal and adapted to be connected with said source by said control means upon the reception of said warning signal, and an oscillator circuit connected with the input circuit of said signal amplifying means and tunable to said predetermined frequency, said oscillator circuit being connectable with said source alternately with said indicating means by said control means in the absence of said warning signal thereby to apply oscillator signals to the input circuit of said signal amplifying means for energizing said control means, whereby said control means connects said source with said indicating means for indicating the operating condition of said receiver.

4. In a radio signal receiving system for periodically receiving and amplifying radio frequency signals and including a signal input circuit and a transistor signal detector having base, emitter and collector electrodes, the combination comprising, an oscillator including a transistor having base, emitter and collector electrodes, and tunable to the same frequency as said radio frequency signals, means connecting the emitter electrode of said oscillator transistor with said signal input circuit, means providing a source of operating voltage, control means connected with the collector electrode of said transistor signal detector and controlled by the collector current thereof, and indicating means providing an indication of the reception of said radio frequency signals and the operating condition of said system, said control means including means operative to connect said source with said indicating means upon the reception of said radio frequency signals and with the collector electrode of said oscillator transistor in the absence of said radio frequency signals.

5. A radio signal receiver for periodically receiving a warning signal of a predetermined frequency comprising, in combination, signal input means for said receiver, signal amplifying means including an input and an output circuit, signal detecting means including an input and an output circuit, means connecting said signal input means with the input circuit of said signal amplifying means, means connecting the output circuit of said signal amplifying means with the input circuit of said signal detecting means, an oscillator including an input and an output circuit and tunable to said predetermined frequency, means connecting the output circuit of said oscillator circuit with said signal input means, indicating means, operating voltage terminal means, relay control means connected with the output circuit of said signal detecting means and including a first and a second contact and a movable switch member adapted to contact said first contact in response to signals from said signal detection means, means connecting said switch member with said terminal means, means connecting said first contact with said indicating means, and means including a time constant network connecting said second contact with said input circuit of said oscillator, said switch member being adapted to contact said first contact in response to signals from said signal detecting means upon the reception of a warning signal of said predetermined frequency and to contact said second contact in the absence of a warning signal to apply operating voltages from said terminal means to the input circuit of said oscillator, said oscillator thereby providing a signal of said predetermined frequency and of an amplitude to energize said relay control means whereby said switch member contacts said first contact and said operating voltages are removed from the input circuit of said oscillator.

6. A radio signal receiver as defined in claim 5 wherein said signal amplifying means, said signal detecting means and said oscillator each include a transistor having base, emitter and collector electrodes and wherein said time constant network connects said second contact with the collector electrode of the oscillator transistor.

7. In a radio signal receiver for periodically receiving and amplifying radio frequency signals and including a signal input circuit and signal detection means, the combination comprising, an oscillator tunable to the same frequency as said radio frequency signals and having an input circuit and an output circuit, means connecting the output circuit of said oscillator with said signal input circuit, means providing a source of operating voltage, a first indicating means providing an indication of the reception of said radio frequency signals and the operating condition of said receiver, a second indicating means providing an additional indication of the reception of said radio frequency signals and of when said radio receiver is inoperative, and control means connected with and energizable by said signal detection means to connect said source with said first indicating means upon the reception of said radio frequency signals and with the input circuit of said oscillator in the absence of said radio frequency signals and to connect said source with said second indicating means upon the reception of said radio frequency signals and when said receiver is inoperative.

8. A radio signal receiver for periodically receiving a signal of a predetermined frequency and providing an indication thereof comprising, in combination, a signal amplifying transistor including base, emitter and collector electrodes, a transistor detector including base, emitter and collector electrodes, means coupling the collector electrode of said signal amplifying transistor with the base electrode of said transistor detector, means providing a source of operating potential, control means connected with the collector electrode of said transistor detector and responsive to the collector current thereof, indicating means for providing an indication of the reception of said signal, means included in said control means for connecting said indicating means with said source upon the reception of said signal, and an oscillator circuit including a transistor having an emitter electrode connected with the base electrode of said signal amplifying transistor and tunable to said predetermined frequency, said oscillator having a collector electrode, means for connecting said collector electrode of said oscillator with said source by said control means in the absence of said warning signal thereby to apply oscillator signals to the base electrode of said signal amplifying transistor for energizing said control means after detection by said transistor detector, whereby said control means connects said source with said indicating means for indicating the operating condition of said receiver.

9. In combination, a signal receiver adapted to receive signals and provide an output signal, activatable means for applying a local signal to said receiver when activated, electrical indicating means, control means connected with said indicating means and coupled with said signal receiver and said first-named means for (*a*) activating said indicating means to provide an indication and for deactivating said first-named means in response to said output signal from said receiver; and (*b*) deactivating said indicating means and for activating said first-named means in the absence of said output signal from said receiver whereby to periodically actuate said indicating means in the absence of received signals, said control means comprising a relay device having first normally open and second normally closed contacts, said first contact being connected with said indicating means, said second contact being connected with said first-named means, and relay device including at least one additional contact normally disposed in contact with said second contact, and a voltage supply circuit, said additional contact being connected to said supply circuit, said relay device being operable in the presence of said received signal to activate said first and said additional contacts to contact each other.

10. In combination, receiver means tuned to a predetermined operating frequency, means coupled to said receiver means for indicating the reception of a signal at said frequency, oscillator means for generating a signal at said frequency, and means coupled to said receiver means and responsive to the presence and absence of an output signal from said receiver means for periodically applying said oscillator signal to said receiver means in the absence of said output signal from said receiver means.

11. The combination as set forth in claim 10 wherein said last-named means includes a time delay means.

12. The combination as set forth in claim 11 wherein said time delay means comprises a resistor-condenser time-constant circuit.

References Cited in the file of this patent

UNITED STATES PATENTS

| | | |
|---|---|---|
| 1,573,801 | Bown | Feb. 23, 1926 |
| 1,625,822 | Potter | Apr. 26, 1927 |
| 1,625,823 | Potter | Apr. 26, 1927 |
| 2,137,349 | Rezos | Nov. 22, 1938 |
| 2,488,815 | Hailes | Nov. 22, 1949 |
| 2,601,472 | Van Weel | June 24, 1952 |
| 2,647,957 | Mallinckrodt | Aug. 4, 1953 |
| 2,716,186 | Ford | Aug. 23, 1955 |